US005542975A

United States Patent [19]
Bitterli

[11] Patent Number: 5,542,975
[45] Date of Patent: Aug. 6, 1996

[54] β-CRYSTAL FORM OF 4,4'-DIAMINO-3,3'-DIBROMO-1,1'-DIANTHRAQUINONYL

[75] Inventor: Peter Bitterli, Reinach, Switzerland

[73] Assignee: Clariant Finance (BVI) Limited, Tortola, Virgin Islands (Br.)

[21] Appl. No.: 493,080

[22] Filed: Jun. 21, 1995

[30] Foreign Application Priority Data

Jun. 23, 1994 [DE] Germany ............... 44 22 052.9

[51] Int. Cl.$^6$ ............... C09B 1/22; C07C 225/34; C07C 50/18
[52] U.S. Cl. ............... 106/493; 552/212
[58] Field of Search ............... 552/212; 106/493

[56] References Cited

U.S. PATENT DOCUMENTS

| | | | |
|---|---|---|---|
| 5,383,966 | 1/1995 | Johnson | 106/495 |
| 5,393,899 | 2/1995 | Inoue et al. | 552/212 |
| 5,416,263 | 5/1995 | Sakaguchi et al. | 552/212 |

Primary Examiner—Mark L. Bell
Assistant Examiner—Scott L. Hertzog
Attorney, Agent, or Firm—Robert S. Honor; Carl W. Battle; Michael P. Morris

[57] ABSTRACT

The new β-modification of the pigment 4,4'-diamino-3,3'-dibromo-1,1'-dianthraquinonyl, having characteristic lines in the X-ray diagram (Guinier/De Wolff, Cu K$\alpha_1$-radiation) according to the FIG. 1 has significant dyeing advantages over the known α-modification.

4 Claims, 2 Drawing Sheets

β-CRYSTAL FORM OF 4,4'-DIAMINO-3,3'-DIBROMO-1,1'-DIANTHRAQUINONYL

The invention relates to the β-crystal form of the pigment 4,4'-diamino-3,3'-dibromo-1,1'-dianthraquinonyl having characteristic lines in accordance with the X-ray diagram (according to Ginier/De Wolff, made with Cu $K\alpha_1$-radiation) of FIG. 1, in which CPS (left verticle scale=counts per second) signifies the intensity of the lines, the upper horizontal scale signifies the lattice spacing d and the lower horizontal scale signifies the Bragg angle.

The α-crystal form of this pigment is notable for other characteristic lines in the X-ray diagram (Guinier/De Wolff, Cu $K\alpha_1$-radiation), see FIG. 2 (the scales have the above-described significances), and is known e.g. from DE-PS 12 05 215.

The new β-crystal modification also differs from the α-crystal modification in its shade (pure red, whereas the α-modification is bluish-red), its improved fastness to overdyeing, and fastness to light, migration and (in particular also) heat.

The β-crystal modification is obtained by means of (heat-)treatment of the known α-modification in a solvent (in which, however, the pigment is practically insoluble), at temperatures between 20° and 180° C., preferably from 100° to 140° C. Depending upon the temperature employed, the treatment should preferably last for about 30 minutes to 8 hours, with stirring.

The new β-modification of the pigment is eminently suitable for dyeing synthetic compositions, whereby these are understood to include solvent-free and solvent-containing compositions consisting of plastics or synthetic resins (in paints having an oil or water base, in lacquers of various kinds, for spin-dyeing viscose or cellulose acetates, for pigmenting polyalkylenes, polystyrene, polyvinyl chloride, rubber and artificial leather). They may also be used for the graphics industry, for paper pulp dyeing, for laminating textiles or for pigment printing.

In the following examples, the parts are by weight.

EXAMPLE 1

50 parts of the 4,4'-diamino-3,3'-dibromo-1,1'-dianthraquinonyl obtained according to DE-PS 12 05 215 (example 1) are heated to 140° C. whilst stirring, in 500 parts of dimethylformamide, and further treated for I hour under these conditions. Then, cooling is effected to room temperature, the pigment is filtered off and washed firstly with cold dimethylformamide, then with cold water, and is dried. The β-crystal modification thus obtained is eminently suitable for the above-mentioned purposes, and the dyeings conform with the highest fastness requirements.

EXAMPLE 2

An identical pigment to the product obtained according to example 1 is obtained, if concentrated acetic acid (500 parts) is used instead of the dimethylformamide according to the procedure of example 1, and the mixture is stirred for two hours at 100° to 110° C.

Figure 1:
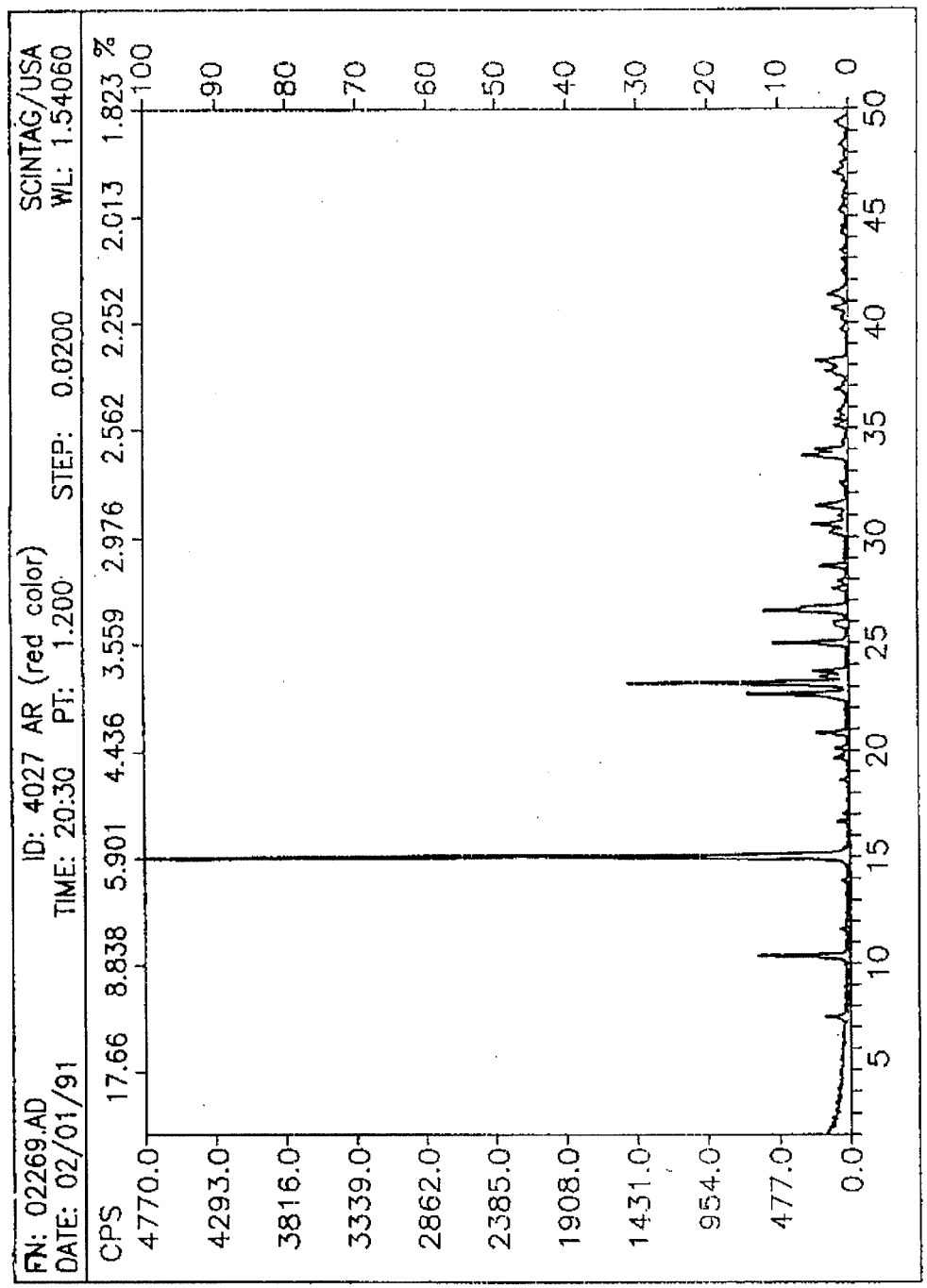
FIG. 1 is an X-ray diagram of the β-crystal form.
Figure 2:
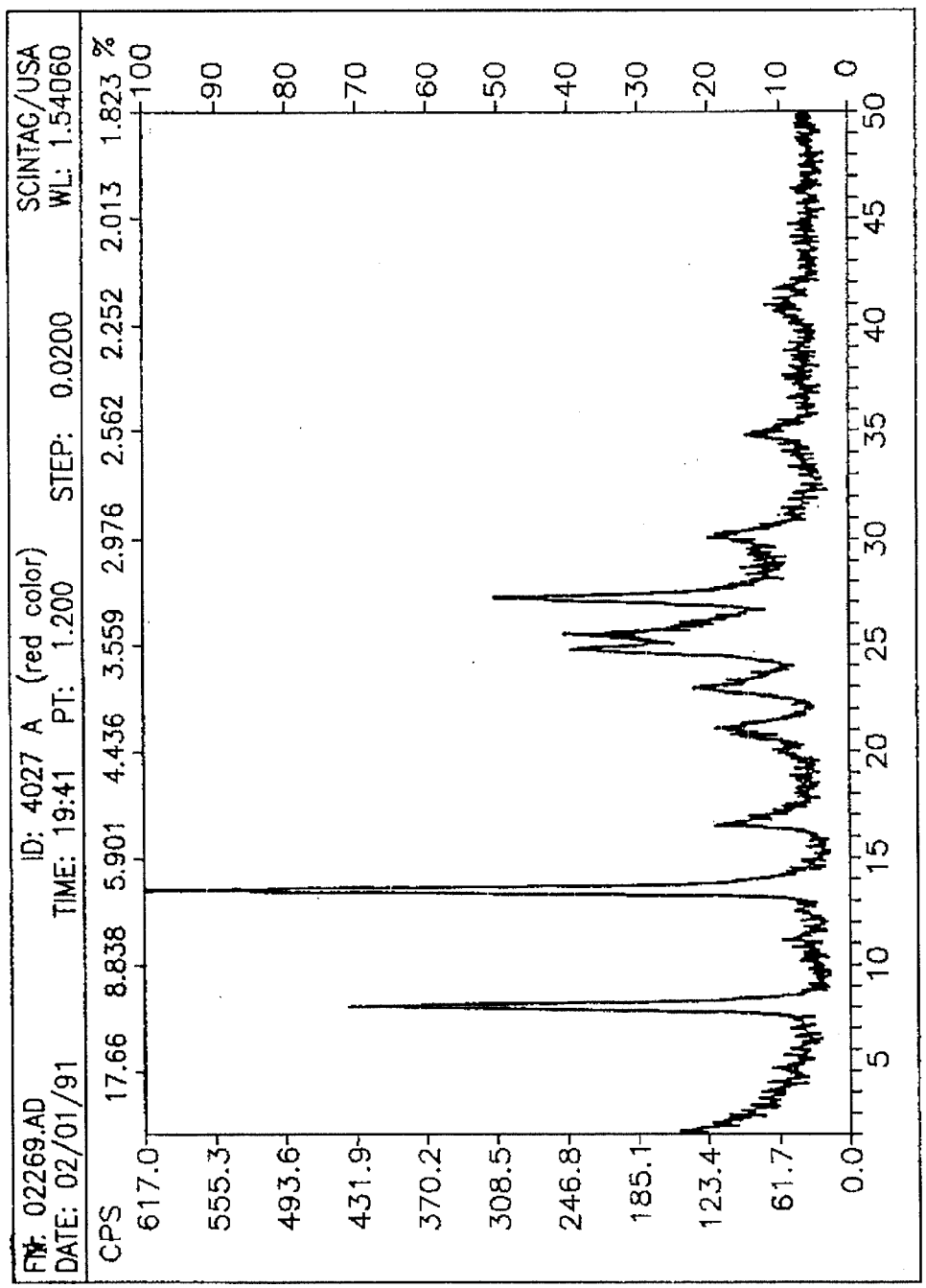
FIG. 2 is an X-ray diagram of the α-crystal form.

I claim:

1. A β-crystal form of 4,4'-diamino-3,3'-dibromo-1,1'-dianthraquinonyl having the X-ray fingerprint depicted in FIG. 1.

2. A process for the production of the β-crystal form of 4,4'-diamino-3,3'-dibromo-1,1'-dianthraquinonyl according to claim 1 comprising reacting an α-crystal form of that compound in a solvent at temperatures of between 20° and 180° C.

3. A method of using the compound according to claim 1 as a pigment comprising mixing a colorant effective amount of the compound with a synthetic composition.

4. A method of using the compound according to claim 1 as a pigment comprising applying a composition containing an effective colorant mount of the compound to a synthetic composition.

* * * * *

UNITED STATES PATENT AND TRADEMARK OFFICE
CERTIFICATE OF CORRECTION

PATENT NO. : 5,542,975
DATED : August 6, 1996
INVENTOR(S) : Peter Bitterli

It is certified that error appears in the above-indentified patent and that said Letters Patent is hereby corrected as shown below:

Column 2, line 10, change "I hour" to -- 1 hour --.

Column 2, line 38, change "mount" to -- amount --.

Signed and Sealed this

Third Day of December, 1996

Attest:

BRUCE LEHMAN

*Attesting Officer*  *Commissioner of Patents and Trademarks*